Patented May 26, 1931

1,807,545

UNITED STATES PATENT OFFICE

ALFONS OSTERSETZER, OF KLOSTERNEUBURG, AND FRANZ RIESENFELD, OF VIENNA, AUSTRIA, ASSIGNORS TO POLLOPAS LIMITED, OF NOTTINGHAM, ENGLAND, A COMPANY OF ENGLAND

PROCESS OF MAKING PHENOL ALDEHYDE CONDENSATION PRODUCTS

No Drawing. Application filed March 20, 1928, Serial No. 263,206, and in Austria April 6, 1927.

The oily or resinous precipitates which are formed when phenols act on aldehydes in the presence of condensing agents of a basic or acid nature, always contain a portion of the raw materials which do not enter into reaction and other substances which are taken up from the originally added solution, which unfavourably affect the product to an extraordinary degree. The endeavour to obtain the condensation products in a pure form has led to a large number of suggestions, all of which aim at freeing the oily or resinous condensation products subsequently from the deleterious admixtures.

As the result of exhaustive investigations and thought it has been found that all the methods hitherto employed contain a fundamental error which makes it impossible from the very outset to produce the initially formed resins in a practically pure state, and for the following reasons:

The product which is first formed in the condensation of phenols with aldehydes is a hydrophobe or water repelling resin which at the moment of its formation is colloidally distributed in the condensation solution, so that in the formation state there is a colloidal emulsion. This emulsion has however very little stability. The particles of resin combine together very quickly to form a coherent precipitate with adsorption of a portion of the substances contained in the solution and with the occlusion of some of the vehicle. There is formed in this way an irreversible colloidal precipitate which settles as an oily or resinous phase to the bottom of the vessel and retains the adsorbed substances with great persistency. A portion of the vehicle and of the substances contained therein become occluded in the greater and lesser capillaries of the resinous mass. Also on the further solidification of the resin precipitate which takes place the adsorbed substances are only given up again with difficulty owing to the small total surface of the separated resin. It is true that by suitable measures the greatest part of the solvent mechanically held in the capillaries can be removed, but on the other hand the substances adsorbed by the coarsely aggregated particles of resin by colloidal chemical superficial forces can only be extracted again with difficulty and only partially. If an attempt be made to dissolve the precipitated resin again and reprecipitate it, a portion of the adsorbed substances will remain in solution it is true, but another portion is again adsorbed on precipitation and occluded in the mass. Purification in this way is therefore only possible with great difficulty, apart from the fact that the repeated solution and precipitation would alter the character of the resin. Also treatment of the condensation products with hydrotropic salts and precipitation with acids can always only remove a portion of the adsorbed substances and this method also brings with it a change in the original resin.

The experiments instituted have led therefore to the following results: If, as according to the present invention, dispersively acting substances (protective colloids) be added to the starting solution before or at the moment of the condensation reaction and the solution diluted to such an extent that the resin cannot separate out in the form of a coherent mass, then the character of the precipitate will be fundamentally modified and a resin will be obtained which, owing to its peculiar form of subdivision subjects itself in the condensation solution, so to speak to a self-purification. Whereas in all methods which have been known hitherto the resin separates immediately after its formation as a coherent phase in the form of an oily or resinous precipitate from the fluid phase, the primarily formed emulsion colloid in the method according to the present invention is stabilized by the presence of the protective colloids. Regarded from a purely phenomenological point of view, what happens according to the present invention is as follows: Whereas in the methods hitherto employed an oily or resinous deposit very quickly collects at the bottom of the vessel, there is formed with the new method in the previously clear liquid a finely divided separation consisting of small drops, so that the liquid assumes a milky character. If now the process be continued for a sufficiently long time, these finely divided drops acquire on continued heating a pulverulent character and the process can be continued as long as may be desired without this pulverulent separation caking together into a solid cake. There exists accordingly contrary to the hitherto known processes no danger of scorching due to prolonged heating. By pouring this fine emulsion into water, solutions of salts or acids or the like or by merely cooling down the condensation solutions it is possible without further treatment to obtain finely pulverulent condensation products which are easily or difficultly soluble, or insoluble, in alcohol.

In some cases, particularly when an excess of formaldehyde is used, a proper precipitation does not take place in the original solution but only an opalescence. On pouring the mixture into water or dilute acid a pulverulent cake is then formed which can be easily broken up.

Thus essentially the process according to the present invention consists therein that in order to produce a pulverulent precipitate of the condensation product, the condensation is carried out in the presence of dispersively acting substances (protective colloids) at such a dilution that the resin can not separate out in the form of a coherent mass. The degree of the dilution which is necessary for the separation of the resin in a powdery form can be determined in each condensation solution. A colloidally dissolved body separates out of solution at a certain dilution, as a coherent phase whilst above this dilution it separates out in the form of a powder. This fact, which is in accord with generally accepted theories of colloid chemistry, is made use of in the process of the present invention. The degree of dilution necessary under the prevailing conditions, in order to cause separation of the resin as a powder, is first of all determined experimentally and then the solution is diluted accordingly. On heating this diluted solution the resin is precipitated in the form of a powder and the added protective colloids prevent the separate small particles of this powder from combining together to form larger particles. The stabilization effect of protective colloids in dilute solutions is also a well known colloidal chemical phenomenon. Both the degree of dilution necessary and the effectiveness of the protective colloids are, as is known in colloid chemistry, mainly dependent on the temperature of the condensation solution, the nature and the quantity of the added materials, the ion-concentration and the like.

It has further been found that it is of great advantage in the process of the present invention to carry out the condensation with the help of basic condensing agents. In addition it has been shown that advantageous effects are obtained when small quantities of neutral salts are added to the condensation solution before the separation of the pulverulent resin.

It has been proposed to add salts of sulphoacids which act as emulsifying agents and it has also been proposed to add albuminous materials in the condensation of phenols with aldehydes. These known processes however, are not conducted at the dilution at which a powdery precipitate of the condensation product is obtained and the added colloidal bodies apparently do not act as stabilization-effecting or protective colloids.

The stabilizing action of the added protective colloids and the retarded aggregation secured thereby is of quite extraordinary importance for the manufacture of the resin, irrespective of whether the primary colloidal emulsion is retained as such by the addition of the protective colloids or whether an aggregation takes place first in a small measure and the protective action only makes itself manifest after a fixed stage of aggregation has been attained, by preserving the particles from further coarsening. In each case the further process takes place in a more or less dispersed system, in which the solid phase, that is to say the resin particles, develop a large external surface as against the liquid phase, without however having the possibility, in consequence of the protective colloids added, of coalescing into large masses. The separate resin particles will therefore solidify in the course of the heating, and the active adsorption coefficient of the separate particles of resin for the substances contained in the solution disappears gradually at the same time. That after coagulation or solidification of a colloidal precipitation the adsorption falls off is a well known colloidal chemical fact. If for example colloidal mercury sulphide be caused to coagulate by a dyestuff, this dyestuff will be first adsorbed by the precipitated colloid. After precipitation has taken place it will be noticed how the dyestuff gradually emerges into the surrounding solution and the solution becomes more and more strongly coloured. In like manner in the present case in proportion as the individual particles of resin solidify, the more will the substances adsorbed by them be thrown off into the solvent surrounding them. The results of this falling off of the adsorption will naturally only appear to be effective in practice so long as the individual resin particles are suspended in the solvent, as it is only in this distribution that the falling off of the power of adsorption is exercised. So long therefore as the induvidual particles of resin are suspended in the solution, a self-purification so to speak takes place, and it is clear that it can also be assisted by a washing process with suitable washing liquids.

In contradistinction hereto, according to the methods hitherto known the primarily formed resin is precipitated at once in a closed phase. The solidification of the resin takes place within compact masses, in which the falling off of the adsorption owing to the small surface no longer acts fully and which are therefore also no longer so easily accessible to washing.

As protective colloids we may use for example gum arabic, saponin, tragacanth, dextrine, gelatine, or other substances which act as protective colloids.

The powders obtained are practically free from all impurities and can be kept for an indefinitive period without changing. Some are perfectly soluble in alcohol and alkalies and can be used for the manufacture of varnishes or the like in the usual way. The powders which are difficultly soluble or insoluble in alcohol may be used in the arts, similarly to the known resin-like masses of the same kind.

To carry out the new process we proceed, for example, as follows:

(1) 100 kg. meta cresol mixture and
    110 kg. formaldehyde 30% by weight are mixed with 190 litres of distilled water in which 2½ kg. of gum arabic have been dissolved, and heated to boiling. As soon as the temperature of the solution has risen to 80° C. 50 litres of double normal caustic soda solution are added, after which the reaction becomes exothermic and the solution boils up strongly. In a few minutes the finely divided oil condensation product separates out, and this can be boiled now as long as desired and is thereby converted gradually into a fine pulverulent form. It is now run off into a wooden cask, in which the liquid is separated either by the addition of cold water or dilute acid. A powder of a sand-like character is formed which is filtered off and freed from the mother liquor.

The product obtained is of a light yellow or light brownish colour.

(2) 100 kg. cryst. carbolic acid are boiled under a reflux condenser with
    110 kg. formaldehyde 30% by weight and
    150 litres of 25% common salt solution in which
    2½ kg. of gum arabic are dissolved and
    50 litres of double normal caustic soda solution
    25 litres of double normal ammonia.

The separation of a milky condensation product soon takes place. The reaction is continued until a sand-like precipitation takes place in the hot liquid itself or on the addition of water or acid solution to a sample taken therefrom. After this the procedure is as in Example 1. The powder obtained is also of a slightly yellow colour.

(3) By replacing the gum arabic solution used in Examples 1 and 2 by a suitable solution of saponin, casein, gelatine, tragacanth and the like, quite similar results are obtained.

(4) On any of the above processes being continued for two hours, the powdery precipitated condensation product becomes insoluble in alcohol and alkali solutions or swells only in these liquids without dissolving completely.

(5) 500 kg. cryst carbolic acid are heated to boiling in a solution of
    1 kg. gum arabic, in
    300 kg. formaldehyde 30% and
    50 kg. double normal caustic soda solution.

In this case the condensation product formed remains colloidally dissolved. After boiling for about one hour a precipitate is formed on a sample being taken and poured into a dilute acid solution. As soon as this moment comes the mass is allowed to run into the corresponding quantity of diluted sulphuric acid and the precipitate formed filtered off and washed.

If the formaldehyde be replaced by other aldehydes, such for example as acetaldehyde, furfural, acrolein, and the like, products of an analogous nature are obtained.

We claim:

1. In making a resinous condensation product of a phenol and an aldehyde, the herein described improvement which comprises reacting said materials together in the presence of a basic condensing agent and in the simultaneous presence of a protective colloid.

2. In the process of making a resinous condensation product of a phenol and an aldehyde, the herein described improvement which comprises heating a phenol and a reactive aldehyde in the presence of a condensing agent, until the condensation reaction takes place, and adding a protective colloid at a stage not later than such reaction being effected, and keeping the mass hot to allow any unreacted phenol and aldehyde to be dissolved out of the reaction mass, while the latter is in a finely divided condition.

3. A process for making a resinous condensation product of a phenol and an aldehyde which comprises heating a phenol and a reactive aldehyde in the presence of considerable quantities of basic substances until the condensation reaction takes place, and adding a dispersively acting substance to the initial condensation solution prior to the condensation reaction.

In testimony whereof we affix our signatures.

ALFONS OSTERSETZER.
FRANZ RIESENFELD.